United States Patent [19]

Finger

[11] 3,987,811
[45] Oct. 26, 1976

[54] CONTROL VALVE MECHANISM FOR CLEANING APPARATUS USING FLUIDS

[75] Inventor: John F. Finger, Beresford, S. Dak.

[73] Assignee: Sioux Steam Cleaner Corporation, Beresford, S. Dak.

[22] Filed: July 9, 1975

[21] Appl. No.: 594,525

[52] U.S. Cl. ............................. 137/111; 137/334; 251/33
[51] Int. Cl.² .................................. F16K 31/143
[58] Field of Search .......... 137/111, 114, 334, 340; 251/33; 222/57; 239/132.1, 132.2, 132.5

[56] References Cited
UNITED STATES PATENTS

| | | | |
|---|---|---|---|
| 180,451 | 8/1876 | Beck | 251/321 X |
| 1,172,527 | 2/1916 | Hill | 137/111 |
| 2,398,775 | 4/1946 | Beekley | 251/33 X |
| 3,575,317 | 4/1971 | Prussin | 137/111 X |

Primary Examiner—Robert G. Nilson
Attorney, Agent, or Firm—Merchant, Gould, Smith, Edell, Welter & Schmidt

[57] ABSTRACT

Mechanism for controlling flow of cleaning fluids under pressure to a discharge nozzle of cleaning apparatus using steam or hot water for industrial cleaning purposes. A control valve for controlling flow of the cleaning fluid is operated by other fluid introduced thereto by an automatically closing manually opened valve. The control valve is arranged to close gradually when the manually opened valve is permitted to close, to prevent shock loads in the fluid system.

2 Claims, 3 Drawing Figures

CONTROL VALVE MECHANISM FOR CLEANING APPARATUS USING FLUIDS

BACKGROUND OF THE INVENTION

This invention relates generally to the art of cleaning apparatus for vehicles of all types, industrial equipment and the like, and more specifically to control means for the delivery of cleaning fluids, such as steam or hot water and detergent, under pressure, to a nozzle for spraying the fluids against a surface to be cleaned.

Heretofore, spraying wands or guns have been provided with manually operated control valves which, under generally continuous use, become uncomfortably hot in the operator's hands. Further, many of these valves have been of the quick shutoff variety which place a severe hydraulic shock load on the various parts of the cleaning equipment, necessitating frequent replacement of hoses and other parts.

SUMMARY OF THE INVENTION

The control valve mechanism of this invention is designed to be relatively cool to the touch and to be manipulated without fatigue or discomfort to the operator. Further, an important object of this invention is to provide a valve mechanism which will shutoff without placing the cleaning equipment under hydraulic shock load.

The control valve mechanism of this invention comprises valve body structure defining a valve chamber and a fluid passageway which includes a pair of spaced passage portions leading from the valve chamber to respective inlet and outlet ports for connection to a source of cleaning fluid under pressure and a discharge nozzle respectively. Fluid delivery means includes a manually operated valve for introducing other fluid under pressure to a portion of the valve chamber remote from said passage portions. A valve element is mounted in the chamber for movements between spaced valve open and valve closed positions, and yielding means biases the valve element toward said valve closed position thereof. The valve element has a transverse opening therethrough movable into and out of registration with said passage portions upon movement of the valve element to its valve open and valve closed positions respectively. The valve element has a restricted passageway establishing communication between said transverse opening and said chamber portion remote from the passage portions for transfer of said other fluid from the manually operated valve to said fluid passageway, when the valve element is in its valve opened position.

DETAILED DESCRIPTION OF THE PREFERRED EMBODIMENT

Figure 1:
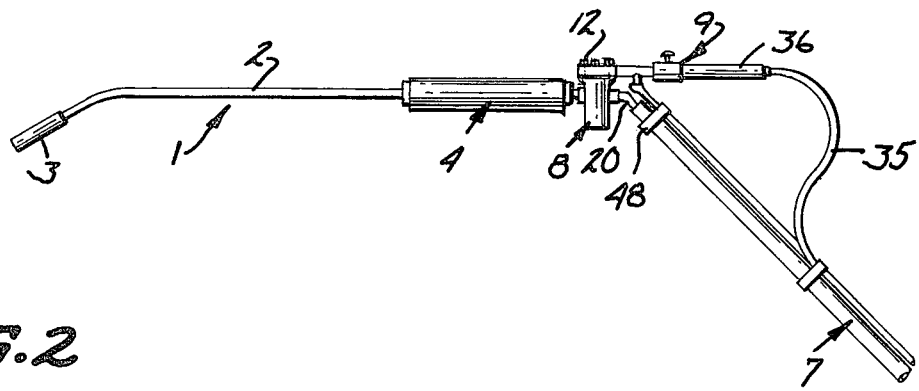
FIG. 1 is a fragmentary view in side elevation of a cleaning gun or wand and fluid connections thereto, showing the control valve mechanism of this invention mounted thereon.

In the drawings, a washing or cleaning wand is indicated generally at 1, the same comprising an elongated hollow metallic tube 2, having a discharge spray nozzle 3 at one end and an elongated handle 4 at its opposite end. The handle 4 includes an outer generally cylindrical jacket 5 and an insulated tubular layer 6 which aids in maintaining the jacket 5 in a relatively cool condition when steam or hot liquids are discharged through the tube 2. Cleaning fluid, such as steam or hot water, is delivered to the wand 1 by means of a conduit 7, usually of flexible material, such as rubber, constructed to withstand relatively high temperatures and pressure.

The control valve mechanism of this invention comprises a fluid pressure operated valve 8 and a normally closed manually operated valve 9, these being arranged to supply fluid to the wand 1. The valve 8 comprises a valve body including a pair of cooperating body sections 10 and 11 that are secured together by simple means, such as machine screws or the like 12, and cooperating to define a chamber in the nature of a longitudinal bore 13 having opposite ends 14 and 15, the former being defined by the body section 11. The body section 10 defines a transverse passageway comprising axially aligned spaced inlet and outlet passage portions 16 and 17 respectively, that lead from diametrically opposite sides of the bore 13 to threaded inlet and outlet ports 18 and 19 respectively. The end of the tube 2 opposite the nozzle 3 is screw threaded into the outlet port 19, the conduit 7 being connected to the valve 8 by a conventional fitting 20 having one end screw threaded into the inlet port 18.

Figure 2:
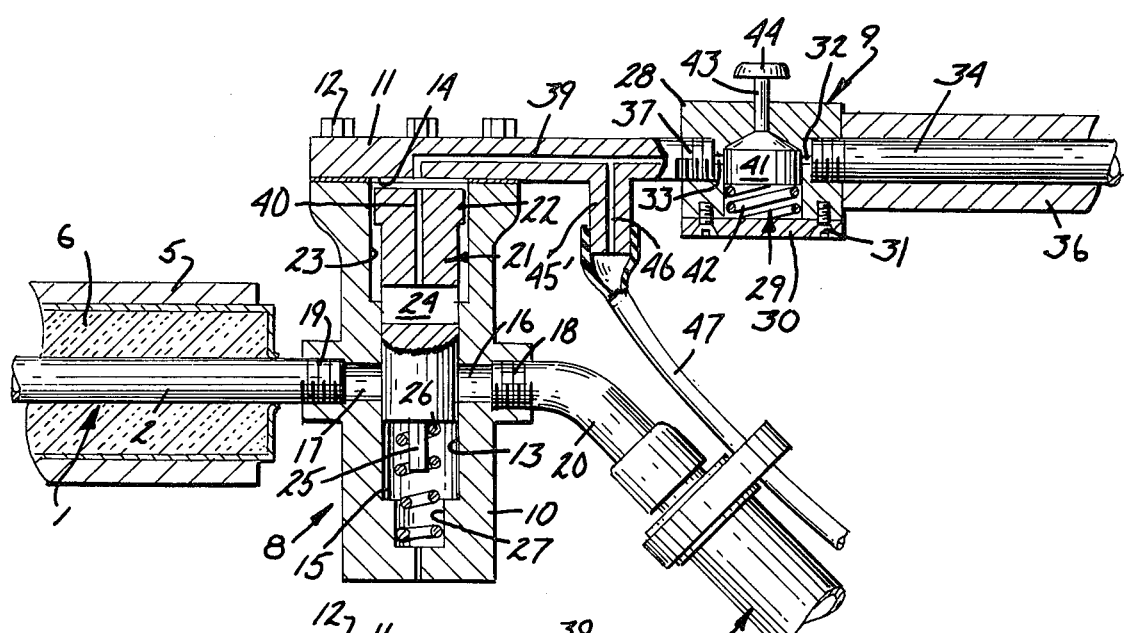
FIG. 2 is an enlarged fragmentary view corresponding to a portion of FIG. 1, some parts being broken away and some parts being shown in section.

A valve element 21, in the shape of a cross-sectionally circular cylinder, is axially slidably mounted in the bore 13, and is formed at one end portion with a diametrically enlarged head 22 that is disposed within a diametrically enlarged bore portion 23 at the end of the valve body section 10 adjacent the body section 11. Intermediate its ends, the valve element 21 is formed to provide an opening 24 that extends transversely therethrough and which is adapted to move into and out of registration with the aligned passage portions 16 and 17, upon axial movement of the valve element 21 in the bore 13. In FIG. 2, the valve element 21 is shown as being disposed in a valve closed position, the valve element 21 being shown as moved to its valve open position in FIG. 3. The valve element 21 is provided with a downwardly projecting pin or boss 25, which supports one end of a coil compression spring 26 that extends downwardly into a recess portion 27 of the bore 13 and yieldingly urges the valve element 21 toward its valve closed position of FIG. 2.

Figure 3:
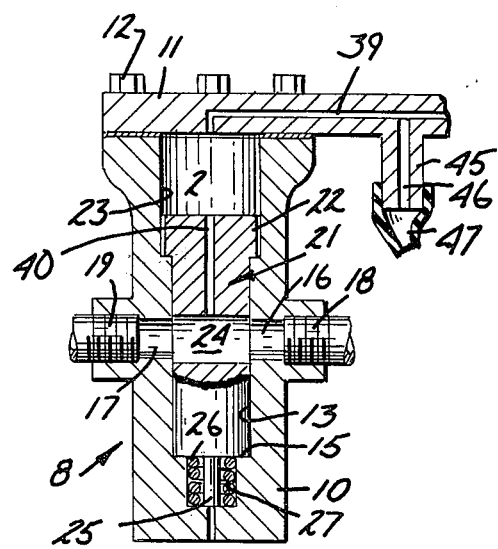
FIG. 3 is a view corresponding to a portion of FIG. 2, but showing a different position of some of the parts.

The manually operated valve 9 constitutes a portion of means for delivering other fluid, such as cold water to the bore 13 between the body section 11 and the enlarged upper end 22 of the valve element 21, for the purpose of moving the valve element 21 to its valve open position, shown in FIG. 3, against bias of the spring 26. As shown in FIGS. 1 and 2, the manually operated valve 9 comprises a valve housing 28 defining a valve chamber 29 that is closed at one end by a closure plate 30, the closure plate 30 being secured to the housing 28 by machine screws or the like 31. The valve housing 28 defines axially aligned inlet and outlet passages 32 and 33 respectively leading from diametrically opposite sides of the chamber 29. The inlet passage 32 communicates with the interior of a water supply tube 34 that is connected to one end of a rubber hose or similar conduit 35. The opposite end of the conduit 35 may be assumed to be connected to a source of cold water or other suitable liquid under pressure, not shown. A tubular handle member 36 encompasses the inlet tube 34 to provide a comfortable grip for the operator.

The outlet passage 33 communicates with the adjacent screw threaded end 37 of an extended portion 38 of the valve body section 11, the end portion 37 being screw threaded into the valve housing 28. The extended portion 38 has a passageway 39 therethrough, one end of the passageway 39 communicating with the outlet passage 33, the opposite end opening into the upper end of the bore 13. As shown in FIGS. 2 and 3, the valve element 21 is axially bored to provide a restricted passageway 40 that extends from the transverse opening 24 to the upper end of the valve element 21, for the purpose of conducting fluid from the passageway 39 to the opening 24, and from thence to the passage portion 17 and wand 1, when the valve element 21 is in its valve open position of FIG. 3.

The manually operated valve 9 further includes a valve member 41 that is movable in the chamber 29 between a normally closed position between the inlet and outlet passages 32 and 33 respectively, and a valve open position shown by dotted lines in FIG. 2, wherein the valve member 41 cooperates with the housing 28 to establish communication between the passages 32 and 33. A coil compression spring 42 is interposed between the valve member 41 and closure plate 30 to yieldingly urge the valve member 41 toward its valve closed position shown by full lines in FIG. 2. The valve member 41 is provided with an axial stem 43 that projects upwardly through a suitable opening in the valve housing 28. A manually operated member in the nature of a button 44 is mounted on the outer end of the stem 43, whereby the valve member 41 may be moved to its valve open position against bias of the compression spring 42. It will be appreciated that, as soon as the operator releases the pressure of his thumb or fingers on the button 44, the valve member 41 will immediately move to its closed position.

In the embodiment of the invention illustrated, the extended portion 38 of the valve body section 11 is provided with a branch portion 45 having a branch passageway 46 therethrough communicating with the passageway 39. A conduit 47 is shown as being connected to the branch portion 45 and may, if desired, be connected at its opposite end to another fluid pressure operated valve, not shown, for any suitable purpose, such as adding detergent liquid to the stream of fluid passing through the conduit 7. In the event that the conduit 47 and parts connected thereto are not needed, the passageway 46 may be plugged in any well-known manner. As shown more or less diagramatically in FIGS. 1 and 2, the conduits 35 and 47 are attached to the conduit 7 by brackets 48.

It will be noted that there is a slight clearance between the enlarged head 22 and the cylindrical wall of the enlarged bore portion 23 so that fluid, such as cold water, may pass around the head 22. Assuming that the conduit 7 is supplied with hot water or steam under pressure, and that the conduit 35 is supplied with cold water or other suitable liquid under pressure, the operator exerts thumb or finger pressure upon the valve button 44 when it is desired to use the wand 1 for washing or cleaning purposes. As cold water is admitted to the upper end of the enlarged bore portion 23, the pressure thereof against the upper enlarged end 22 of the valve element 21 will move the valve element 21 axially against bias of the compression spring 26 until the valve element 21 reaches its valve open position shown in FIG. 3. As soon as the opening 24 in the valve element 21 comes into register with the passage portions 16 and 17, some cold water will flow through the restricted opening 40 to mix with the hot water or steam passing through the opening 24 into the wand 1. As long as the valve 9 is held in its valve open position, cold water will flow therethrough and through the restricted passageway 40, maintaining the valve 9 in a relatively cool condition. As soon as pressure is relieved on the valve button 44, the valve member 49 will move to its closed position, whereupon the valve element 21 will move toward its closed position under bias of the spring 26. During initial closing movement of the valve element 21, water in the upper enlarged portion 23 of the bore 13 will be forced axially inwardly through the restricted passageway 40, retarding closing movement of the valve element 21. In practice, the time element between full open and closed positions of the valve element 21, during closing movements thereof, is of substantially one second duration. This is sufficient to ease the hydraulic shock load to the conduit 7 and steam or hot water generating apparatus, connected therewith, particularly when hot water is used. When the branch conduit 46 is opened to another valve similar to the valve 8, such other valve will close in the same manner.

While we have shown and described a preferred embodiment of our control valve mechanism, it will be understood that the same is capable of modification without departure from the spirit and scope of the invention, as defined in the claims.

What is claimed is:

1. A control valve mechanism for cleaning apparatus using fluids comprising:
    a. valve body means defining, a cylindrical bore providing a valve chamber, and a fluid passageway including axially aligned passage portions leading from said chamber in directions transversely of the axis of said chamber and to respective inlet and outlet ports for connection to a source of cleaning fluid under pressure and a discharge nozzle respectively;
    b. fluid delivery means including a manually operated push button valve for introducing other fluid under pressure to a portion of said chamber remote from said passage portions;
    c. a cylindrical valve element slidably mounted in said chamber for axial movements therein between axially spaced valve open and valve closed positions;
    d. and yielding means biasing said valve element toward said valve closed position;
    e. said valve element having a fluid passageway extending therethrough in a direction normal to the axis thereof and movable into and out of registration in axial alignment with said aligned passage portions upon movement of said valve element to its valve open and valve closed positions respectively;
    f. said valve element having a restricted passageway establishing communication between said valve element passageway and said chamber portion remote from said passage portions for transfer of said other fluid from said manually operated valve to said fluid passageway when said valve element is in its valve open position.

2. The control valve mechanism defined in claim 1 in which said valve element includes a diametrically enlarged head at one end, said bore having a diametrically enlarged end portion for reception of said enlarged head, said fluid delivery means including a passageway to said enlarged end portion of said bore, said valve element defining an axial passageway extending from said enlarged end thereof to said fluid passageway in the valve element.

* * * * *